United States Patent
Patange et al.

(10) Patent No.: US 10,182,072 B2
(45) Date of Patent: Jan. 15, 2019

(54) RF COMMUNICATION DEVICE WITH ACCESS CONTROL FOR HOST INTERFACE

(71) Applicant: NXP B.V., Eindhoven (NL)

(72) Inventors: Sreedhar Patange, Bangalore (IN); Nitin Labdhe, Bangalore (IN); Martin Liebl, Gleisdorf (AT)

(73) Assignee: NXP B.V., Eindhoven (NL)

( * ) Notice: Subject to any disclaimer, the term of this patent is extended or adjusted under 35 U.S.C. 154(b) by 56 days.

(21) Appl. No.: 14/611,060

(22) Filed: Jan. 30, 2015

(65) Prior Publication Data

US 2015/0222663 A1  Aug. 6, 2015

(30) Foreign Application Priority Data

Jan. 31, 2014 (EP) .................................. 14153555

(51) Int. Cl.
*H04L 29/06* (2006.01)
*H04W 4/80* (2018.01)
*G07F 7/08* (2006.01)
*H04B 5/00* (2006.01)
*G06F 21/71* (2013.01)

(52) U.S. Cl.
CPC .............. *H04L 63/18* (2013.01); *G06F 21/71* (2013.01); *G07F 7/0826* (2013.01); *H04B 5/0062* (2013.01); *H04L 63/10* (2013.01); *H04W 4/80* (2018.02)

(58) Field of Classification Search
CPC ......... H04L 63/10; H04L 63/18; G06F 21/44; G06F 21/71; G07F 7/082; H04W 4/008; H04W 4/80; H04B 5/0062
See application file for complete search history.

(56) References Cited

U.S. PATENT DOCUMENTS 5,974,500 A * 10/1999 Maletsky ............ G06F 12/1433
                                                              365/120
6,046,676 A    4/2000 Ward et al.
(Continued)

FOREIGN PATENT DOCUMENTS

EP    1028396 A2    8/2000
EP    1876571 A2    1/2008
(Continued)

OTHER PUBLICATIONS

European Search Report for European Patent Application 14153555 dated May 2, 2014.
(Continued)

*Primary Examiner* — Joseph P Hirl
*Assistant Examiner* — Chi Nguy

(57) ABSTRACT

There is described an RF communication device, the device comprising (a) a data memory for storing data, (b) an RF interface (112) for RF communication with an external RF device (130), (c) a host interface (111) for communication with a host device (120), (d) a host access memory unit (214, 215) comprising host interface access control data, the host interface access control data defining host access rules for accessing data in the data memory through the host interface (111), and (e) a host access control unit for, based on the host interface access control data, controlling access to data in the data memory through the host interface (111). There is also described a system and a method.

12 Claims, 3 Drawing Sheets

(56) References Cited

U.S. PATENT DOCUMENTS

| | | | |
|---|---|---|---|
| 6,094,724 A * | 7/2000 | Benhammou | G06Q 20/105 705/41 |
| 2006/0033608 A1 | 2/2006 | Juels | |
| 2008/0012685 A1* | 1/2008 | Friedrich | G06Q 20/341 340/5.25 |
| 2010/0134257 A1 | 6/2010 | Puleston et al. | |
| 2010/0274712 A1* | 10/2010 | Mestre | G06K 19/07749 705/39 |
| 2010/0311466 A1* | 12/2010 | Wilson | G06Q 20/341 455/557 |
| 2012/0159148 A1* | 6/2012 | Behren | G06Q 20/3552 713/150 |
| 2013/0063253 A1 | 3/2013 | Rashid et al. | |
| 2013/0073818 A1* | 3/2013 | Wakerly | G06Q 20/352 711/156 |

FOREIGN PATENT DOCUMENTS

| | | |
|---|---|---|
| FR | 2898995 A1 | 9/2007 |
| WO | WO-9926253 A1 | 5/1999 |
| WO | WO-9927499 A2 | 6/1999 |
| WO | WO-20040044825 A1 | 5/2004 |
| WO | WO-20060015617 A1 | 2/2006 |

OTHER PUBLICATIONS

Garfinkel & L et al., RFID Privacy: An Overview of Problems and Proposed Solutions, Security & Privacy, IEEE Service Center, Los Alamitos, CA, vol. 3, No. 3, May 1, 2005.

Jules A et al., High-Power Proxies for Enhancing RFID Privacy and Utility, Lecture Notes Computer Science/Computational Science, Springer, vol. 3856, pp. 210-226, Jan. 1, 2005.

Melanier Rieback et al., RFID Guardian: A Battery-Powered Mobile Device for RFID Privacy Management, Information Security and Privacy, Lecture Notes in Computer Science, Springer, pp. 184-194, Jun. 30, 2005.

"Mifare" NXP Semiconductors, 1 pg, retrieved from the internet Jan. 29, 2015 at: www.mifare.net.

"Type 1 Tag Operation Specification, Technical Specification, T1TOP 1.1", NFC Forum, 47 pgs, retrieved from the internet at: apps4android. org/nfc-specifications/NFCForum-TS-Type-1-Tag_1.1.pdf (Apr. 13, 2011).

"Type 2 Tag Operation Specification, Technical Specification, T2TOP 1.1", NFC Forum, 53 pgs, retrieved from the internet at: apps4android. org/nfc-specifications/NFCForum-TS-Type-2-Tag_1.1.pdf (May 31, 2011).

"Type 3 Tag Operation Specification, Technical Specification, T3TOP 1.1", NFC Forum, 33 pgs, retrieved from the internet at: apps4android. org/nfc-specifications/NFCForum-TS-Type-3-Tag_1.1.pdf (Jun. 28, 2011).

"Type 4 Tag Operation, Technical Specification, T4TOP 2.0", NFC Forum, 38 pgs, retrieved from the internet at: apps4android.org/ nfc-specifications/NFCForum-TS-Type-4-Tag_2.0.pdf (Nov. 18, 2010).

"ISO14443-3, International cards—Contactless Integrated Circuit Cards—Proximity Cards, Part 3: Initialization and Anticollision", ISO/IEC, 70 pgs, retrieved from the internet at: http://www.iso.org/ iso/catalogue_detail.htm?csnumber=50942 (Apr. 15, 2011).

"NFC Forum Type Tags—White Paper V1.0" NXP, 24 pgs., retrieved from Internet Archive at: https://web.archive.org/web/20130421040819/ http://www.nfc-forum.org/resources/white_papers/NXP_BV_Type_ Tags_White_Paper-Apr_09.pdf (Apr. 1, 2009).

"MF1S703x MIFARE Classic 4K—Mainstream contactless smart card IC for fast and easy solution development—Rev. 3.0", 36 pgs., retrieved from the internet archive at: http://www.mouser.com/ds/ 2/302/MF1S703x-91210.pdf (Dec. 2, 2010).

Office Action from EP counterpart patent application No. 14153555.9 (dated Mar. 15, 2018).

* cited by examiner

| Sector | Block |
|---|---|
| 31 | 3 |
| | 2 |
| | 1 |
| | 0 |
| ... | ... |
| 0 | 3 |
| | 2 |
| | 1 |
| | 0 |

Byte Number within a Block

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Key A | | | | | | Access Bits | | | | Key B | | | | | |
| | | | | | | | | | | | | | | | |
| | | | | | | | | | | | | | | | |
| | | | | | | | | | | | | | | | |
| Key A | | | | | | Access Bits | | | | Key B | | | | | |
| Manufacturer Data | | | | | | | | | | | | | | | |

| Description |
|---|
| Sector Trailer 31 |
| Data |
| Data |
| Data |
| ... |
| ... |
| ... |
| Sector Trailer 0 |
| Data |
| Data |
| Manufacturer Block |

RF COMMUNICATION DEVICE WITH ACCESS CONTROL FOR HOST INTERFACE

CROSS-REFERENCE TO RELATED APPLICATIONS

This application claims the priority under 35 U.S.C. § 119 of European patent application no. 14153555.9, filed on Jan. 31, 2014, the contents of which are incorporated by reference herein.

FIELD OF THE INVENTION

The present invention relates to the field of RF communication devices, in particular to RFID and NFC tags comprising a host interface.

ART BACKGROUND

Identification products, such as smart cards and RFID (Radio Frequency Identification) tags (known as well as Proximity Integrated Circuit Card—PICCs), are widely used in fields such as transport (ticketing, road tolling, baggage tagging), finance (debit and credit cards, electronic purse, merchant card), communications (SIM card for GSM phone), and tracking (access control, inventory management, asset tracking). International standard ISO14443A is the industry standard for contactless smart cards. ISO14443A-compliant products such as MIFARE (www.mifare.net) and NFC (www.nfc-forum.org) provide radio frequency communication technology for transmitting data between a card or tag and a reader device. For example, in electronic ticketing for public transport, travellers just wave their card over a reader at the turnstiles or entry point, benefiting from improved convenience and speed in the ticketing process. Such products are set to be the key to individual mobility in the future, supporting multiple applications including road tolling, airline tickets, access control and many more.

In general contactless cards are used as part of a secure infrastructure that includes a backend system, card readers and card validators, and possibly other equipment such as personalization and controlling equipment.

The data content of the cards generally represents some kind of value that can draw the attention of certain individuals to explore the security features of the card. However, the security of the entire system relies on all components of the infrastructure and must, therefore, not just rely upon the security implementation on the contactless cards. All parts of the system must be designed along with security targets amongst all its mission critical functions. Threats are derived from these security targets along with their potential countermeasures.

Each system deploying contactless smart cards has its own unique combination of system attributes which only the system integrators and their customers can understand as a whole. It is up to the system integrators and customers to determine and deploy the best balance between the security measures implemented in the different components. The best balance must include consideration of the trade-offs between cost, user interface (ease-of-use), and the required level of security.

Smart cards are typically used for the applications with high security requirements, while RFID tags are more low-cost oriented for application, where less security is required.

The RFID tags with RF-only interface can be used as standalone tags/cards for various applications such as transport, finance, communications & tracking. But this kind of RFID tags lack the usage in electronic solutions due to the absence of a host communication interface.

The RFID tags with host interface gives the flexibility to be used in electronic solutions where NFC solutions get benefited. In such a system, a host interface could be used to exchange the data with the RF interface through the tag memory.

In an existing low cost RFID/NFC contactless tag, RF authentication procedures preceding any memory operation ensures that access to a memory block is only possible by authentic users. Such memory content protection procedures/features are only defined in the existing RFID standards such as MIFARE, NFCFORUM, etc. for contactless RF interfaces.

Addition of a host interface (HIF) such as I2C, USB, SPI, UART, etc. to an RFID/NFC contactless tag opens up a huge application space such as smooth Bluetooth/Wi-Fi handover, device configurations, advanced gaming applications, etc. At the same time, however, this would also make the NVM (non volatile memory) content in the tag vulnerable for unauthenticated access via the HIF.

There may thus be a need for an improved RFID/NFC tag without the above drawbacks.

SUMMARY OF THE INVENTION

This need may be met by the subject matter according to the independent claims. Advantageous embodiments of the present invention are set forth in the dependent claims.

According to a first aspect there is provided an RF communication device, in particular an RFID or NFC tag, the device comprising (a) a data memory for storing data, (b) an RF interface for RF communication with an external RF device, (c) a host interface for communication with a host device, (d) a host access memory unit comprising host interface access control data, the host interface access control data defining host access rules for accessing data in the data memory through the host interface, and (e) a host access control unit for, based on the host interface access control data, controlling access to data in the data memory through the host interface.

This aspect is based on the idea that access to data in the data memory through the host interface is controlled by use of a set of host access rules stored in a host access memory unit. Thereby, read and/or write access to the data through the host interface can be controlled and security maintained.

The host device may be any electronic device, such as a personal computer, a mobile phone, a game controller etc.

Each host access rule may correspond to a particular memory location and may comprise a set of bits defining whether it is allowed to access the particular memory location through the host interface, e.g. whether it is allowed to read data from the particular memory location and transfer it to the external host device through the host interface. The bits of the host access rule may further define whether it is allowed to write data received through the host interface to the particular memory location.

The host access control unit may be a separate hardware unit, a part of a hardware unit or it may be implemented as software on a processing unit.

When an external host device connected to the host interface attempts to access data at a particular location in the data memory, the host access control unit checks whether such an access is allowable in view of the corresponding host access rule(s) of the host interface access control data, and depending on the result of the check, either allows or blocks the access.

Thereby, access, i.e. readout, deletion and overwrite of sensitive data in the data memory through the host device can be efficiently controlled.

According to an embodiment, the data memory comprises a plurality of data memory units, and the host interface access control data comprises a host access rule for each data memory unit, each host access rule defining either read/write access, read only access or no access to the corresponding data memory unit through the host interface.

The data memory is organized in a plurality of data memory units, such as sectors or blocks. Each memory unit preferably consists of a predetermined number of bytes for storing data. Furthermore, each data memory unit may be associated with a unique identifier.

For each of the data memory units, a corresponding host access rule specifies whether the specific data memory unit may be accessed through the host interface, i.e. whether data may be read out from and/or written to the specific data memory unit through the host interface.

Thereby, each host access rule defines whether the external host device is able to access a particular data memory unit when communicating with the RF communication device through the host interface.

According to a further embodiment, the host interface access control data are one time programmable.

In the present context, the term "one time programmable" may in particular denote that, depending on the current values of the host interface access control data, these values may be changed once or not at all.

More specifically, a particular bit of the host interface access control data having the value "0" may be changed to "1" whereas a particular bit having the value "1" may not be changed.

Thereby, arbitrary changes of the access rules, in particular cyclically repeated switching between "write allowed" and "write not allowed", can be prevented. This in particular prevents the situation where e.g. a host device changes an access rule, an external RF device responds by changing the same rule back to the previous value, the host device repeats the change, and so on.

According to a further embodiment, the host access memory unit further comprises lock data, the lock data defining rules for enabling/disabling updating the host interface access control data through the RF interface and/or the host interface.

In other words, the lock data defines whether an external RF device may update the host interface access control data, i.e. change one or more values of the host interface access control data. Similarly, the lock data defines whether the host device may update the host interface access control data, i.e. change one or more values of the host interface access control data.

The lock data is preferably one time programmable.

By controlling the possibility of updating the host interface access control data, security is further improved.

According to a further embodiment, the data memory further comprises RF interface access control data, the RF interface access control data defining RF access rules for accessing data in the data memory through the RF interface, and wherein the host interface access data comprises a host access rule that defines no access to the RF interface control data through the host interface.

The RF interface access control data are similar to the host interface access control data in the sense that it serves to control access to the data memory through the RF interface, i.e. access from an external RF device in communication with the device.

By including a host access rule in the host interface access data blocks access to the RF interface access control data via the host interface, security is further improved as it is impossible to tamper with the RF interface access control data from the host device.

According to a further embodiment, the device further comprises an RF access control unit for, based on the RF interface access control data, controlling access to data in the data memory through the RF interface.

The RF access control unit may be implemented together with or separate from the host access control unit.

The RF access control unit essentially functions in the same manner as the host access control unit, i.e. it determines whether the RF access control data allow access to a particular part of the data in the data memory through the RF interface.

According to a further embodiment, the data memory comprises the host access memory unit.

In other word, the host interface access control data is stored in the data memory.

Thereby, no additional memory is needed in the RF communication device, and the host access control mechanism may be easily implemented as software in existing devices without significant modifications being necessary.

According to a further embodiment, the host access memory unit comprises a plurality of software registers or fuses.

In other words, instead of storing the host interface access control data in conventional memory, the host interface access control data is defined by setting a plurality of software registers or by blowing some of a plurality of fuses.

Thereby, the host interface access control data can be made unavailable for end users by masking during the chip configuration or production test.

According to a further embodiment, the RF communication device is an NFC tag comprising a reserved memory area, and wherein the host access memory unit is part of the reserved memory area.

By storing the host interface access control data in the reserved memory area of an NFC tag, access control to the data in the user area can be efficiently provided without sacrificing security.

According to a further embodiment, the host access memory unit further comprises authentication key data for authenticating communication with the host device.

By authenticating the communication with the host device, security is further enhanced. If authentication fails, the device will reject or block any request for communication received at the host interface.

According to a second aspect, there is provided a system comprising (a) an RF communication device according to the first aspect or any of the above embodiments, and (b) a host device, wherein the host device is communicatively coupled to the host interface of the RF communication device.

The host device may be any electronic device, such as a personal computer, a mobile phone, a game controller etc. Accordingly, the system consists of such an electronic device equipped with an RF communication device, such as an RFID or NFC tag, providing a corresponding RF communication capability. The RF communication device may communicate with the host device via the host interface, while maintaining security by controlling access from the host device to the data stored in the data memory of the RF communication device.

According to a third aspect, there is provided a method of controlling access to data in a data memory of an RF communication device, the RF communication device comprising (i) an RF interface for RF communication with an external RF device, and (ii) a host interface for communication with a host device, the method comprising (a) providing host interface access control data defining host access rules for accessing data in the data memory through the host interface, and (b) based on the host interface access control data, controlling access to data in the data memory through the host interface.

This aspect is essentially based on the same idea as described above with regard to the first aspect.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular a combination of features of the method type claims and features of the apparatus type claims, is considered to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment to which the invention is, however, not limited.

BRIEF DESCRIPTION OF THE DRAWING

FIG. 2 shows a typical data memory structure of a known RF communication device.

DETAILED DESCRIPTION

Figure 1:
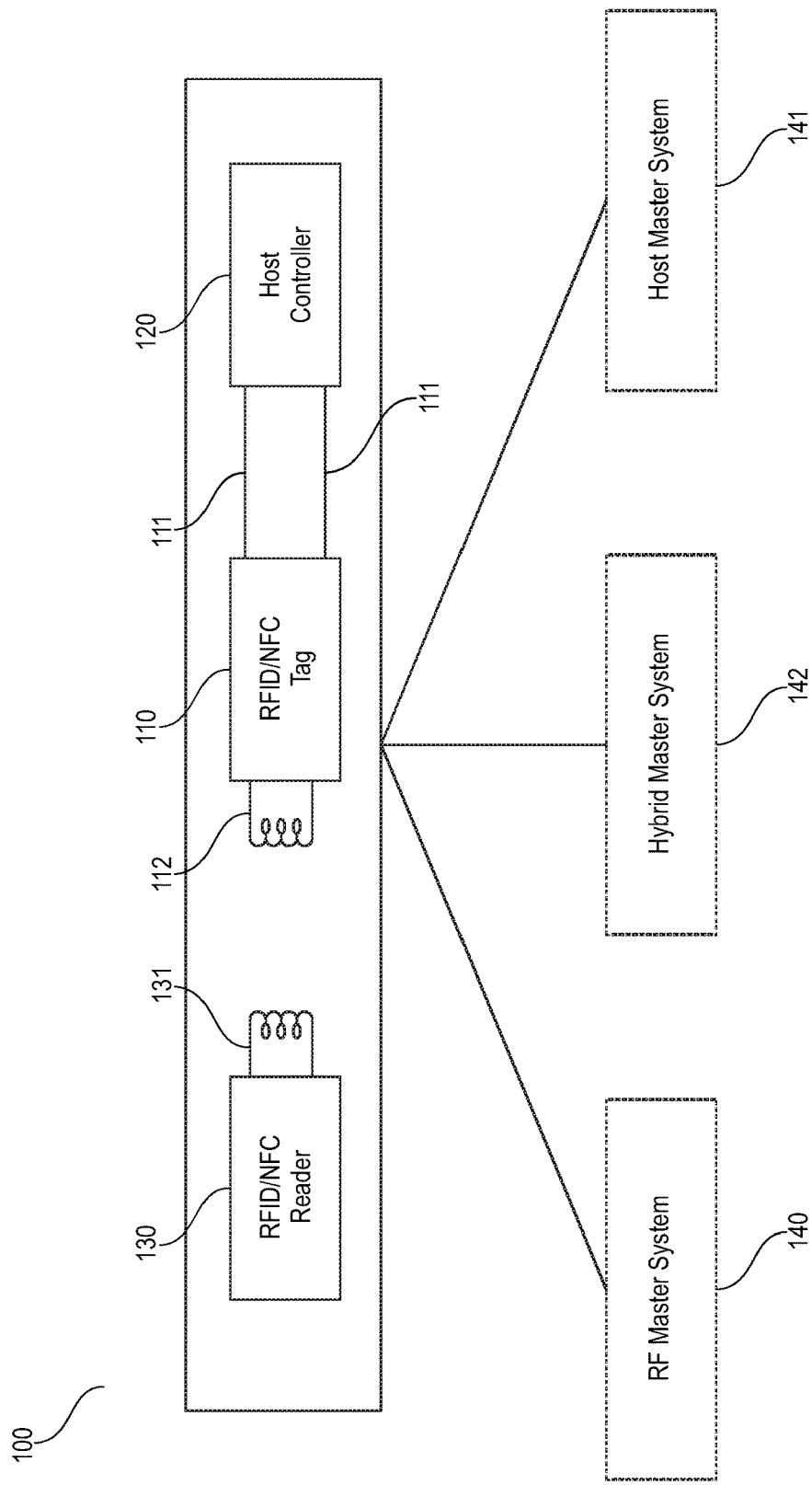
FIG. 1 shows a block diagram of a system in accordance with an embodiment.

The illustration in the drawing is schematic. It is noted that in different figures, similar or identical elements are provided with the same reference signs or with reference signs, which differ only within the first digit.

FIG. 1 shows a block diagram of a system 100 in accordance with an embodiment. The system 100 comprises a tag (e.g. an RFD or NFC tag) 110, a host controller 120 and an tag reader 130. The tag 110 is coupled to the host controller 120 through host interface 111 (I2C), such that the host 120 may access the tag's memory, session registers, etc. The tag 110 also comprises an RF interface 112 for communicating with the tag reader 130 through the latter's corresponding RF interface 131, when the tag 110 and reader 130 are sufficiently close.

FIG. 1 further shows three possible control or master systems: an RF Master System 140, a Host Master System 141, and a Hybrid Master System 142. In the case of the RF Master System (RFMS) 140, the RF interface 112 is considered to be the trusted interface and has full authority of the tag 110. In such a system, RF—being the trusted interface—can completely block the host 120 from memory accesses and also not allow the host 120 to update the relevant access control data (AC bytes). Hence, RF is expected to control the memory access protection mechanism via the host interface 111. On the contrary, in the case of a Host Master System (HMS) 141, the host interface 111 is considered to be the trusted interface and has full authority of the tag 110. In such a system, the host interface 111—being the trusted interface—can access the memory and update the relevant AC bytes, if required. Hence, RF may not be expected to control the memory access protection mechanism via the host interface 111. Finally, in case of the Hybrid Master System (HyMS) 142, the access control data may be controlled from each of the interfaces (RF interface 112 and host interface 111) based on the use cases. For instance, certain advanced gaming applications require a dedicated memory area that can be accessed only by RF, only HIF and both. Hence, measures are required to appropriately protect memory access via the host interface 111.

FIG. 2 shows a typical data memory structure 213 of a known RF communication device. More specifically, FIG. 2 shows a typical Mifare classic based memory of 2 Kbytes that is organized in 32 sectors (sectors 0, 1, . . . , 30, 31) of 4 blocks (blocks 0, 1, 2, 3) each. As shown, each block contains 16 bytes (bytes 0, 1, . . . , 14, 15). As indicated on the right-hand side of FIG. 2, the memory 213 could be categorized into Manufacturer block, Sector Trailer and Data blocks. The manufacturer block consists of IC manufacturer data that is programmed either by the IC manufacturer or by the system provider and write protected. Both of them being authentic and trusted, the security threat posed here are already well defined for the RFID/NFC tags via RF interface 131. As a security measure, the host interface 111 should be blocked from accessing critical information in the manufacturing block.

In a typical Mifare Classic tag, the last block (block3) in a sector is called sector trailer and consists of key information used for authentication purposes via RF.

In a given system, the host side should be permanently blocked from accessing this sector trailer information. This would make the new tags with host interface backward compatible to existing RFID tags without host interface. Hence the security via RF is not compromised.

The remaining 48 bytes in a sector (32 bytes in sector0) are considered as user data. This could be accessed from RF side only after the specific sector is authenticated with appropriate keys known to an authentic proximity coupling device (PCD). Thus the user data is secure from RF side.

In use cases such as Gaming applications, RF is the master interface and is expected to control the memory access of the host interface. Since there are no existing bytes available in sector trailer for controlling access via the host interface, one of the data blocks may be used to control the access via the host interface and this block would no longer be used in value block format.

However with a host interface attached to a tag, such as Mifare Classic, the user data is no longer secure from the host interface side. If the host has unrestricted access to memory, then an attacker can easily manipulate the data by just connecting a host interface, such as I2C initiator.

Hence it is necessary to ensure that the user data in the non volatile memory is restricted and not easily accessible by the unauthentic host via host interface (e.g., I2C).

Figure 3:
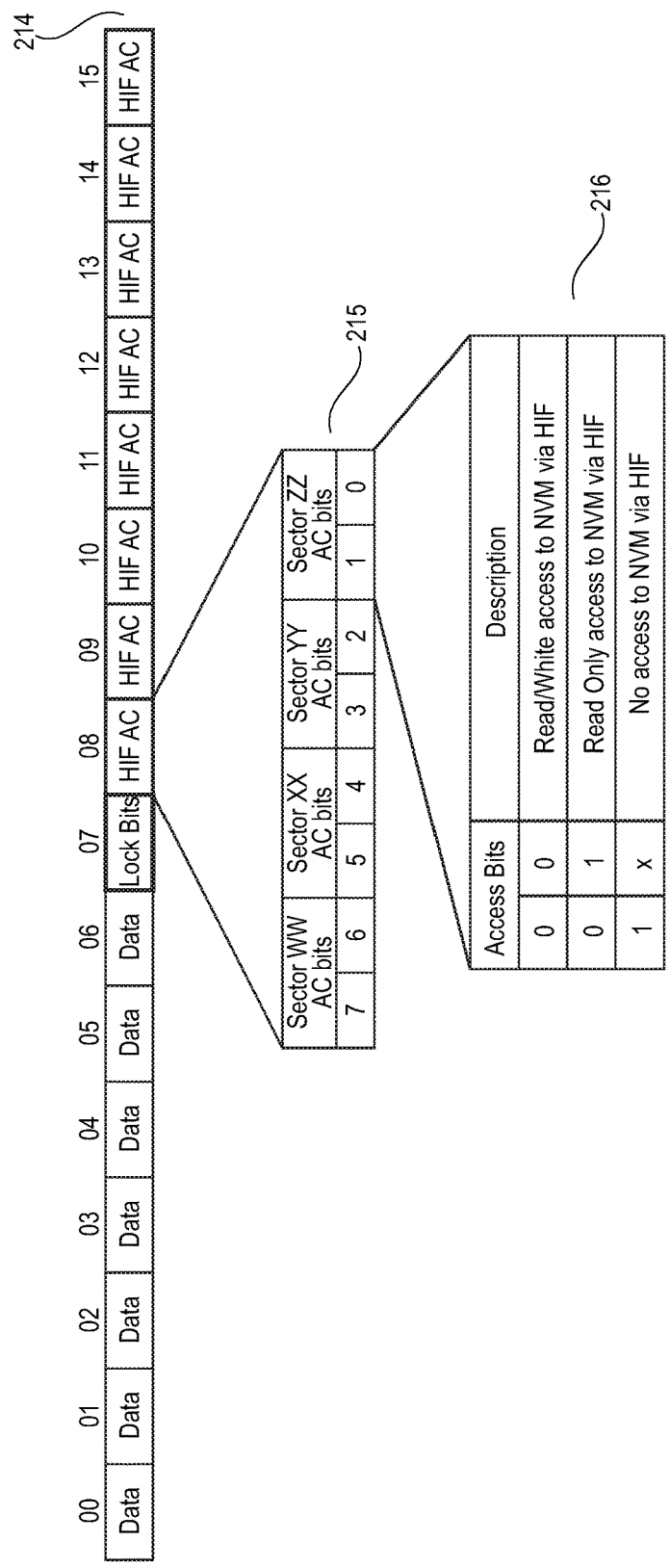
FIG. 3 shows a part of a data memory structure of an RF communication device in accordance with an embodiment.

FIG. 3 shows a part 214 of a data memory structure of an RF communication device (RFID/NFC tag) in accordance with an embodiment. More specifically, FIG. 3 shows one block 214 of data memory, which is partially used for storing access control data for the host interface (HIF AC). As shown, the first seven bytes (00, 01, 02, 03, 04, 05, and 06) of the block 214 contain data, while the last eight bytes (08, 09, 10, 11, 12, 13, 14, 15) contain host interface access control data. More specifically, as shown at 215, Byte 08 of block 214 contains two access bits for each of four sectors, i.e. sector WW, sector XX, sector YY, and sector ZZ. The possible access rights for sector ZZ as defined by bits 0 and 1 in the byte 215 are shown at 216: If both bits 0 and 1 are zero, both read and write access to sector ZZ is allowed via the host interface. If bit 0 is one and bit 1 is zero, only read access to sector ZZ is allowed via the host interface. Finally, if bit 1 is one, no access to sector ZZ is allowed via the host interface In operation, the access bits are used as follows: Based on the bit values of relevant access control bits stored in non volatile memory, hardware (processor) takes appropriate action for any attempt of memory access via the host interface to protect the corresponding memory sector.

The access right bytes could be OTP (one time programmable) and programmed appropriately during production test. This defines the intended access for an authentic user and prevents unintentional access from an unauthentic user via host interface.

If the bytes are OTP and set to a value (0 or 1 depending on OTP implementation value), then they are no longer allowed to be changed back.

If the bytes are OTP & they are allowed only to change from 0→1, then these bytes could be updated from 0→1 by the RF reader 130 only after the specific sector is authenticated. Thus making these bits secure from RF side.

The host 120 could update these OTP bits via host interface 111 from 0→1 provided it has the required access as per FIG. 3.

All the above mentioned steps for data blocks are implemented in the Mifare mode to protect the memory content from unauthentic host access.

Referring again to FIG. 3, byte 07 of block 214 contains lock bits for each interface. These lock bits provide an extended protection mechanism to completely block either of the interfaces RF 112 or host 111 from updating the host interface access control bytes. These lock bits must be OTP i.e., once they are set to '1' they cannot be changed back to '0' based on the OTP implementation.

The below Table 1 shows two lockbits: HOST_HIFAC_UPDATE_DIS defining whether updating of the host interface access control data through the host interface 111 is enabled or disabled, and RF_HIFAC_UPDATE_DIS defining whether updating of the host interface access control data through the RF interface 112 is enabled or disabled.

TABLE 1

| Bit Name | Details |
| --- | --- |
| HOST_HIFAC_UPDATE_DIS | 0: Enable updating the HIF AC bytes via HIF. |
| | 1: Disable updating the HIF AC bytes via HIF. |
| RF_HIFAC_UPDATE_DIS | 0: Enable updating the HIF AC bytes via RFIF. |
| | 1: Disable updating the HIF AC bytes via RFIF. |

It is noted that, unless otherwise indicated, the use of terms such as "upper", "lower", "left", and "right" refers solely to the orientation of the corresponding drawing.

It should be noted that the term "comprising" does not exclude other elements or steps and that the use of the articles "a" or "an" does not exclude a plurality. Also elements described in association with different embodiments may be combined. It should also be noted that reference signs in the claims should not be construed as limiting the scope of the claims.

The invention claimed is:

1. An RF communication device comprising:
a data memory configured to store data, where the data memory comprises a plurality of data memory units, wherein each sector of the data memory is defined to have either read/write access, read only access, or no access;
an RF interface configured for RF communication with an external RF device;
a host interface configured for communication with a host device;
a host access memory unit comprising host interface access control data and one time programmable (OTP) lock data that define whether either the external RF device or the host device may update the host interface access control data, the host interface access control data defining host access rules for respectively accessing data in each data memory unit through the host interface, wherein each host access rule defines either read/write access, read only access, or no access for a corresponding sector through the host interface; and
a host access control unit configured to control, based on the host interface access control data, access to data in the data memory through the host interface.

2. The RF communication device according to claim 1, wherein the host interface access control data are one time programmable.

3. The RF communication device according to claim 1, wherein the data memory further comprises RF interface access control data, the RF interface access control data defining RF access rules for accessing data in the data memory through the RF interface, and the host interface access data comprises a host access rule that defines no access to the RF interface control data through the host interface.

4. The RF communication device according to claim 1, further comprising:
an RF access control unit configured to control, based on the RF interface access control data, access to data in the data memory through the RF interface.

5. The RF communication device according to claim 1, wherein the data memory comprises the host access memory unit.

6. The RF communication device according to claim 1, wherein the host access memory unit comprises:
a plurality of software registers or fuses.

7. The RF communication device according to claim 1, wherein the RF communication device is an NFC tag comprising a reserved memory area, and the host access memory unit is part of the reserved memory area.

8. The RF communication device according to claim 1, wherein the host access memory unit further comprises authentication key data for authenticating communication with the host device.

9. A system comprising:
a data memory configured to store data, where the data memory comprises a plurality of data memory units, wherein each sector of the data memory is defined to have either read/write access, read only access, or no access;

an RF interface configured for RF communication with an external RF device;

a host interface configured for communication with a host device;

a host access memory unit comprising host interface access control data and one time programmable (OTP) lock data that define whether either the external RF device or the host device may update the host interface access control data, the host interface access control data defining host access rules for respectively accessing data in each data memory unit through the host interface, wherein each host access rule defines either read/write access, read only access, or no access for a corresponding sector through the host interface; and a host access control unit configured to control, based on the host interface access control data, access to data in the data memory through the host interface; and a host device, wherein the host device is communicatively coupled to the host interface of the RF communication device.

10. A method of controlling access to data in a data memory of an RF communication device comprising a plurality of data memory units, wherein each sector of the data memory is defined to have either read/write access, read only access, or no access, the RF communication device comprising an RF interface for RF communication with an external RF device, and a host interface for communication with a host device, the method comprising providing host interface access control data defining host access rules for respectively accessing data in the each data memory unit through the host interface, and based on the host interface access control data;

providing one time programmable (OTP) lock data that define whether either the external RF device or the host device may update the host interface access control data; and controlling access to data in the data memory through the host interface, wherein each host access rule defines either read/write access, read only access, or no access for a corresponding sector through the host interface.

11. The RF communication device of claim 1, wherein the host access control unit is a separate hardware unit.

12. The RF communication device of claim 1, wherein each data memory unit is associated with a unique identifier.

* * * * *